(12) United States Patent
McElreath

(10) Patent No.: US 7,272,472 B1
(45) Date of Patent: Sep. 18, 2007

(54) SYSTEM AND METHOD FOR IMPROVING AIRCRAFT FORMATION FLYING ACCURACY AND INTEGRITY

(75) Inventor: Kenneth W. McElreath, Mt. Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 602 days.

(21) Appl. No.: 10/891,853

(22) Filed: Jul. 15, 2004

(51) Int. Cl.
*G06F 7/00* (2006.01)

(52) U.S. Cl. ......................................... 701/3
(58) Field of Classification Search ................ 701/3
See application file for complete search history.

(56) References Cited

U.S. PATENT DOCUMENTS

| | | | |
|---|---|---|---|
| 4,674,710 A | | 6/1987 | Rodriguez |
| 5,043,903 A | | 8/1991 | Constant |
| 5,113,193 A | * | 5/1992 | Powell et al. ............. 342/25 F |
| 5,991,691 A | * | 11/1999 | Johnson ....................... 701/214 |
| 6,459,411 B2 | | 10/2002 | Frazier et al. |
| 6,646,588 B2 | | 11/2003 | Tran |
| 6,657,578 B2 | | 12/2003 | Stayton et al. |

OTHER PUBLICATIONS

Patent Application for "Relative Navigation for Automated Aerial Refueling Using Datalink Signals" by Gary A. McGraw et al., filed May 19, 2004.
Patent Application for "Aircraft Formation/Refueling Guidance System" by Kenneth W. Mc Elreath, filed herewith.

* cited by examiner

*Primary Examiner*—Thu V. Nguyen
(74) *Attorney, Agent, or Firm*—Nathan O. Jensen; Kyle Eppele

(57) ABSTRACT

An aircraft formation positioning system lead aircraft transmits a continuous RF signal and a periodic data burst with lead aircraft position. A follower aircraft receives the continuous RF signal and the periodic data burst. A follower aircraft resolver determines bearing, distance and elevation relative to the lead aircraft from the continuous RF signal. The follower aircraft transmits an intermittent RF signal and a periodic data burst with its relative position determined from the continuous RF signal. The lead aircraft receives the intermittent RF signal and the periodic data burst from the follower aircraft. A lead aircraft resolver performs an independent measurement of the lead aircraft position relative to the follower aircraft from the intermittent RF signal. A lead aircraft Kalman filter connected to the lead aircraft resolver and receiver correlates the independent measurement of the lead aircraft position relative to the follower aircraft with the received periodic data burst.

17 Claims, 2 Drawing Sheets

SYSTEM AND METHOD FOR IMPROVING AIRCRAFT FORMATION FLYING ACCURACY AND INTEGRITY

CROSS REFERENCE TO RELATED APPLICATIONS

The present application is related to co-pending application Ser. No. 10/848,708 filed on May 19, 2004, entitled "Relative Navigation for Automated Aerial Refueling Using Datalink Signals" by Gary A. McGraw, Robert J. Frank, Kenneth M. Peterson, Richard S. Haendel, and Scott J. F. Zogg. The present application is related to co-filed application Ser. No. 10/891,857 filed herewith entitled "Aircraft Formation/Refueling Guidance System" by Kenneth W. Mc Elreath. The co-filed and co-pending applications are assigned to the assignee of the present invention.

BACKGROUND OF THE INVENTION

The present invention relates to navigation and guidance of multiple aircraft when formation flying. The advantages of formation flight have long been known for fuel saving and defensive purposes. By flying in a V formation, aircraft can save fuel by flying behind the wing of a neighboring plane where there is less drag in an area of lower resistance. Military aircraft have been flown in formation for defensive purposes such as concentrated firepower in bomber formations and wingmen in fighter formations.

Commercial aircraft may also realize benefits by formation flying. The air cargo industry may benefit the most with overnight package delivery service aircraft flying in formation for fuel saving benefits. Another application for formation flying may be air traffic management. Air traffic controllers could use formation flying to optimize air space by parking aircraft in tight formations to save fuel while waiting to land.

However, formation flying is dangerous due to potential collisions between aircraft or an aircraft losing control due to disturbances in the air. Systems have been developed to reduce the risk of formation flying.

Station keeping is a method of maneuvering a follower aircraft to maintain a predetermined location relative to a leader aircraft for formation flying. Station keeping equipment (SKE) such as the AN/APN-169 is used on some US Air Force aircraft to enable aircraft to maintain formation positions by providing position error data. Position error data is obtained by converting SKE radar range and bearing measurements into along heading and cross heading positions and comparing these to desired heading positions.

When operating in a multiple aircraft formation, conventional station keeping equipment and relative positioning systems (such as GPS, TCAS, ADS-B) rely on independent, absolute positioning navigation systems in each aircraft or on single-measurement relative positioning means to assess the relative positions of all aircraft in the formation. These means do not have sufficient integrity or accuracy to safely fly in close formation with many aircraft. As a result, the formations are loosely flown and are subject to single-failure disruptions, as well as enemy detection, jamming and spoofing.

What is needed is an improved method of formation flying by obtaining robust, accurate and failure-tolerant relative bearing, distance and elevation information between a lead aircraft and each follower aircraft, and between each pair of follower aircraft.

SUMMARY OF THE INVENTION

An aircraft formation positioning system and method for improving aircraft formation flying accuracy and integrity is disclosed. In a two aircraft formation, a continuous RF signal and a periodic data burst having lead aircraft position data is transmitted from a lead aircraft. The continuous RF signal and the periodic data burst from the lead aircraft are received in a first follower aircraft. The first follower aircraft determines bearing, distance and elevation relative to the lead aircraft from the continuous RF signal. The first follower aircraft in turn transmits an intermittent RF signal and a periodic data burst. The periodic data burst has relative position data of the first follower aircraft determined from the lead aircraft continuous RF signal. The lead aircraft receives the intermittent RF signal and the periodic data burst from the first follower aircraft. The lead aircraft performs an independent measurement of lead aircraft position relative to the first follower aircraft from the received intermittent RF signal. The lead aircraft correlates the independent measurement of the lead aircraft position relative to the first follower aircraft with the received periodic data burst from the first follower aircraft in a Kalman filter. A signal output from the Kalman filter is compared with a known lead aircraft position to provide an indication of the aircraft formation positioning system integrity.

The method for improving aircraft formation flying accuracy and integrity further comprises receiving the continuous RF signal and the periodic data burst from the lead aircraft in each aircraft in a formation of two or more follower aircraft. Each follower aircraft in a formation of two or more follower aircraft determines bearing, distance and elevation relative to the lead aircraft from the lead aircraft continuous RF signal. Each follower aircraft performs independent measurements of its own bearing, distance, and elevation relative to each of the other follower aircraft using intermittent RF bursts from those follower aircraft. Each follower aircraft correlates the bearing, distance and elevation relative to the lead aircraft with each follower's reported relative position received in a periodic data burst by using a Kalman filter thereby enabling every follower aircraft in the formation to validate and improve accuracy of its own relative position estimate. A guidance signal output is provided from the Kalman filters in each follower aircraft for guiding each of the follower aircraft. The follower aircraft may detect an error in the aircraft formation positioning system. The follower aircraft may continue flying for a period of time after losing the continuous RF signal from the lead aircraft. A follower aircraft may take over the formation as acting lead aircraft when the lead aircraft continuous RF signal fails.

It is an object of the present invention to provide an improved method of obtaining robust, accurate and failure-tolerant relative bearing, distance and elevation information between a lead aircraft and each follower aircraft, and between each pair of follower aircraft in formation flying.

It is an object of the present invention to provide a system where only a lead aircraft transmits continuously while follower aircraft perform bearing, distance, and elevation measurements from the continuous transmission and only transmit intermittently.

It is an advantage of the present invention to provide a system having distributed processing for formation positioning and integrity monitoring to all aircraft in the formation thereby minimizing the processing throughput loading on one aircraft.

It is an advantage of the present invention to provide a system that becomes more robust, accurate, and fault tolerant as the system becomes larger with more follower aircraft.

It is a feature of the present invention to provide a system wherein a follower aircraft can become an acting lead aircraft when a lead aircraft fails to transmit.

It is a feature of the present invention to utilize Kalman filter processing to significantly improve accuracy in formation flying.

BRIEF DESCRIPTION OF THE DRAWINGS

The invention may be more fully understood by reading the following description of the preferred embodiments of the invention in conjunction with the appended drawings wherein.

DETAILED DESCRIPTION

The present invention is for an aircraft formation positioning system that integrates low probability of intercept (LPI) passive direct RF bearing, distance, and elevation measurements, on-board Kalman filter processing and positive integrity monitoring to produce a highly robust and accurate relative positioning system for formation flight.

Figure 1:
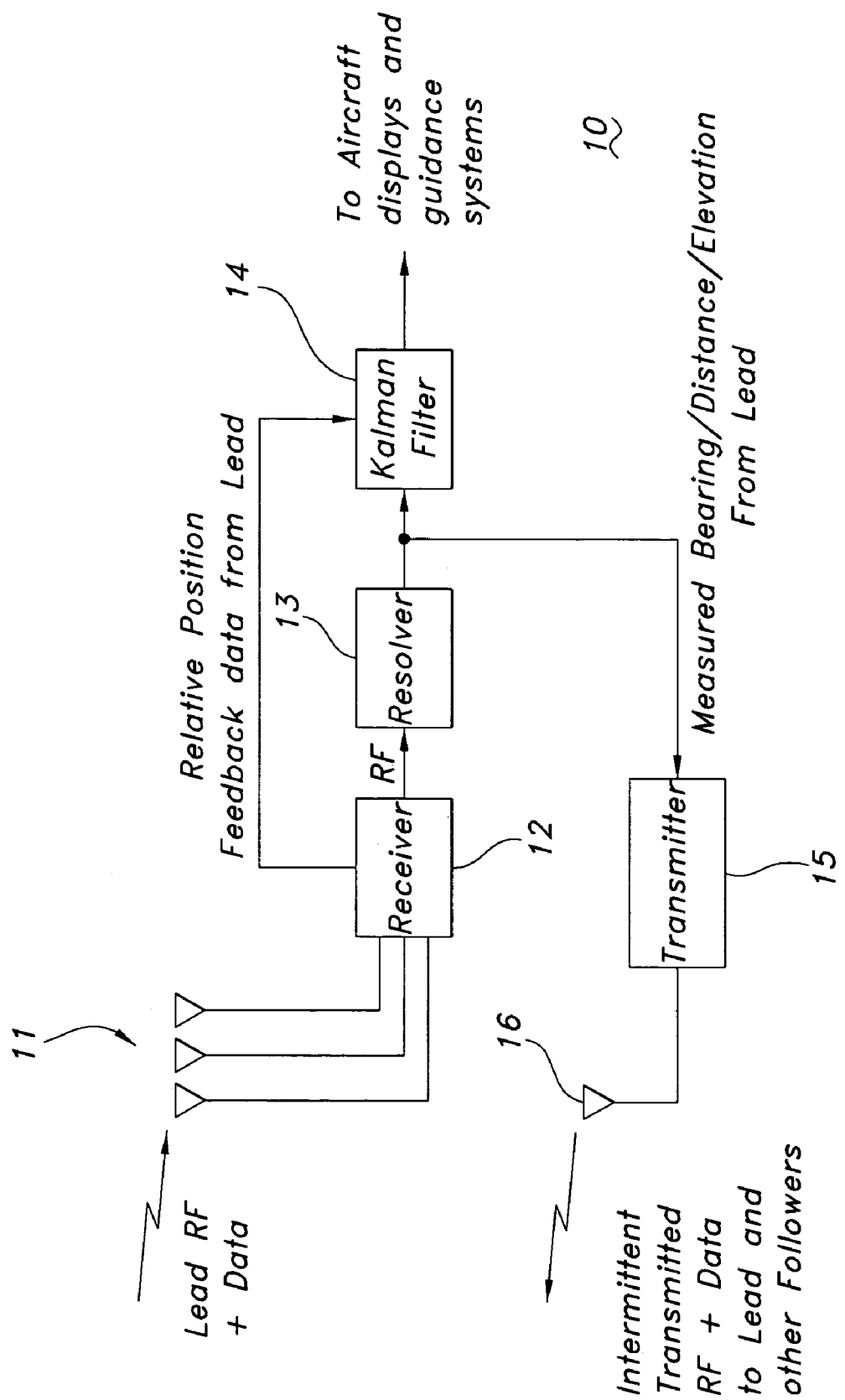
FIG. 1 is a block diagram showing an implementation of the aircraft formation positioning system of the present invention.
Figure 2:
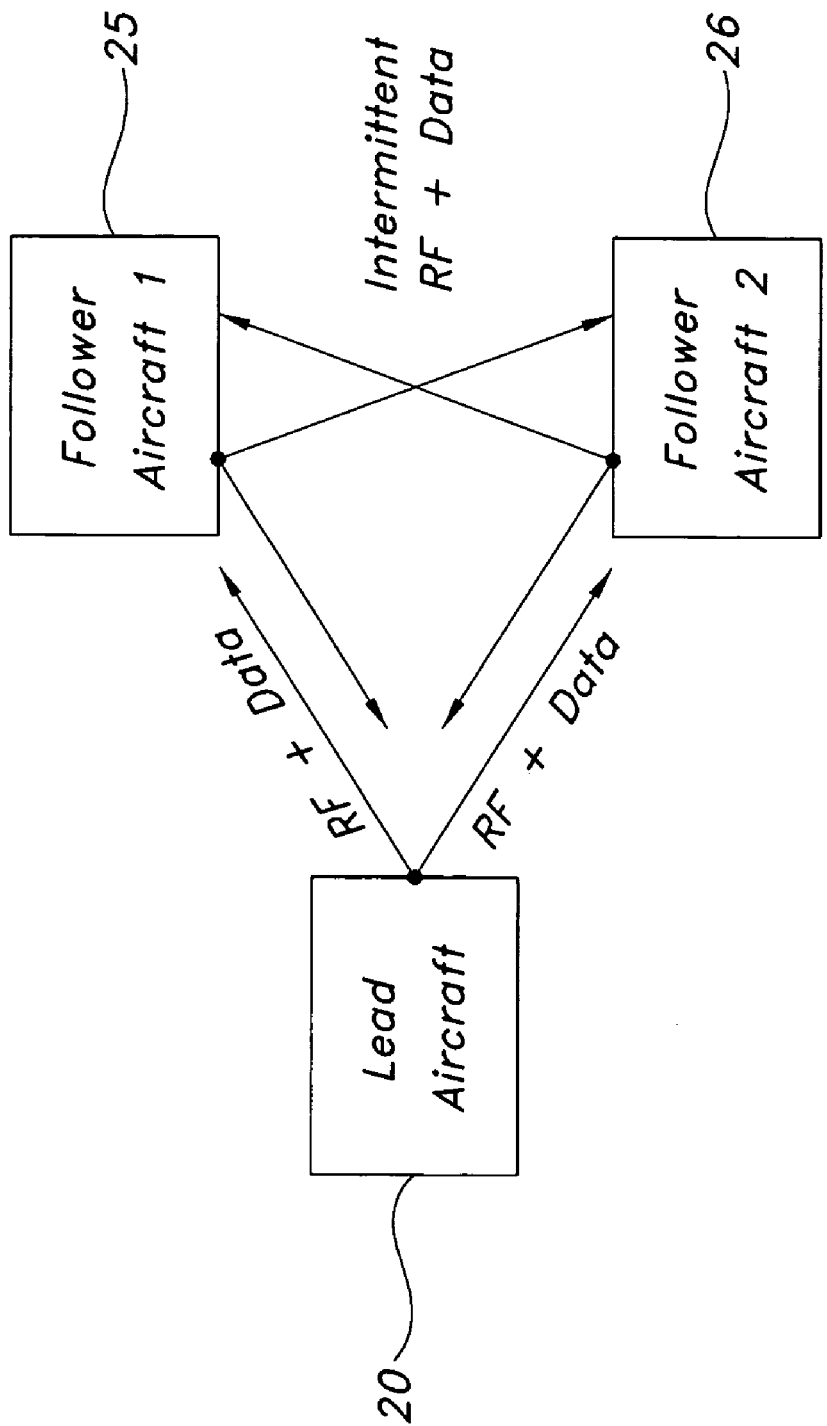
FIG. 2 is diagram showing the aircraft formation positioning system of the present invention installed on aircraft in a formation to provide multiple aircraft connectivity.

The aircraft formation positioning system 10 of the present invention is shown in FIG. 1. FIG. 2 shows a formation of aircraft including lead aircraft 20 and follower aircraft 25 and 26 that utilize the aircraft formation positioning system 10 of FIG. 1. The aircraft formation positioning system 10 in FIG. 1 is shown configured in a follower aircraft mode where transmitter 15 transmits an intermittent RF signal and periodic data burst signal. The aircraft formation positioning system 10 may also be configured in a lead aircraft mode where transmitter 15 transmits a continuous RF and a periodic data burst signal.

In FIG. 1 an antenna array 11 comprising several antenna elements that receive signals from a transmitting aircraft that may be the lead aircraft 20 or one of the follower aircraft 25 and 26 of FIG. 2. The signal transmitted from the lead aircraft 20 is a continuous RF signal along with a periodic data burst containing lead aircraft 20 position data. The signal transmitted by follower aircraft 25 and 26 is an intermittent RF signal along with a periodic data burst containing follower aircraft position data.

Using conventional direction finding techniques such as time-of-arrival, phase difference or amplitude processing techniques with the antenna array 11 or a phased-array antenna (not shown) in FIG. 1, the aircraft 20, 25, and 26 determine bearing, distance and elevation relative to another aircraft 20, 25, or 26. These direction finding techniques are well-known in the art.

Receiver 12, on board a receiving aircraft that may be the lead aircraft 20 or one of the follower aircraft 25 and 26, processes the RF signals received by antenna array 11 in accordance with the type of direction finding technique employed and also receives a data signal containing the relative position of the transmitting aircraft. Outputs from the receiver 12 include relative position feedback data of a transmitting aircraft determined from the received periodic data burst from the transmitting aircraft. The transmitting aircraft may be the lead aircraft 20 or one of the follower aircraft 25 and 26. Receiver 12 processes the continuous RF signal received from the leader aircraft 20 or the intermittent RF signal from one of the follower aircraft 25 and 26 and provides an RF output containing the processed direction finding signals from the antenna array 11. The RF output is passed to a resolver/processor 13 that processes the RF output into measured bearing, distance, and elevation of the transmitting aircraft. The resolver/processor 13 may be any means for separating a combined system of data into its component pieces. The measured bearing, distance, and elevation signal from resolver 13 is passed to a transmitter 15 on board the receiving aircraft that transmits, using antenna 16, the measured bearing, distance, and elevation signal as the data signal containing the relative position of the receiving aircraft to the transmitting aircraft.

The measured bearing, distance, and elevation of the transmitting aircraft from resolver 13 in the receiving aircraft and the periodic data burst containing the relative position of the transmitting aircraft received by the receiving aircraft are correlated in a Kalman filter 14. Kalman filters 14 are known the art and are mathematical algorithms used to estimate the state of a system from measurements containing random errors.

Referring again to FIG. 2, a formation of aircraft that utilizes the aircraft formation positioning system 10 of FIG. 1 in each of the aircraft 20, 25, and 26 is shown. In FIG. 2 the lead aircraft 20 transmits the continuous RF signal along with the periodic data burst. These lead aircraft signals are received by one or more of the follower aircraft 25 and 26. FIG. 2 shows a first follower aircraft 25 and a second follower aircraft 26 but a plurality of follower aircraft may be used with the present invention with each follower aircraft receiving the signals from the lead aircraft 20 and from each other.

The first follower aircraft 25 intermittently transmits an RF signal similar to that transmitted by the lead aircraft 20, along with a periodic data burst to communicate to the first follower aircraft 25 its relative position from the lead aircraft 20. The intermittent RF signal and periodic data burst is received by the lead aircraft 20 and by the second follower aircraft 26 and any other follower aircraft (not shown).

The lead aircraft 20 receives a RF transmission from the first follower aircraft 25 and performs an independent measurement of its own position relative to the first follower aircraft 25 using the intermittent RF signal from the first follower aircraft 25. The lead aircraft 20 then correlates this measurement with the bearing/distance/elevation periodic data burst received from the first follower aircraft 25 in a Kalman filter process in the Kalman filter 14. The output of the Kalman filter 14 is presented to the crew in the lead aircraft 20 to obtain an indicator of the aircraft formation positioning system 10 integrity by comparing the lead aircraft position from the Kalman filter with a known lead aircraft 20 position obtained from other aircraft systems such as GPS (not shown) in the lead aircraft.

In each follower aircraft 26 and 26, the output of the Kalman filter 14 is used to develop guidance signals and displays to maintain the formation position. Because the two relative position measurements are statistically uncorrelated, this process results in significantly improved accuracy, excellent error detection and fault tolerance in case of a signal failure in either aircraft.

In formations of two or more follower aircraft, each follower aircraft also makes low-rate independent measurements of its own bearing/distance/elevation relative to each of the other follower aircraft using the intermittent RF bursts from those follower aircraft. These measurements, coupled with its own continuous direct measurements with respect to the lead aircraft 20 and each follower's similarly-reported relative position, enable every follower aircraft in the formation to improve the accuracy of its own relative position estimate, to detect errors in the system and to continue for a period of time after losing the continuous signal from the lead aircraft 20 by using the intermittent RF bursts from other formation members. If the lead aircraft 20 continuous transmission fails or is interrupted, any other aircraft can take over as the acting lead with no disruption to the formation. In fact, the larger the formation, the more robust, accurate and fault-tolerant the entire system becomes.

The present invention has the additional advantage that the processing for formation positioning and integrity monitoring is distributed between all of the aircraft in the formation, thus minimizing the processing throughput loading on any one aircraft.

In the present invention, only the lead aircraft 20 transmits continuously. This continuous signal is the primary means by which the follower aircraft determine their formation positions. The follower aircraft are passive except for intermittent RF signal and periodic data bursts, which are difficult for an enemy to track and jam.

The method for improving aircraft formation flying accuracy and integrity in present invention is now described in detail. Each of the aircraft is equipped with the aircraft formation positioning system 10 shown in FIG. 1. The leader aircraft 20 in FIG. 2 transmits a continuous RF signal and a periodic data burst using its transmitter 15 and transmitting antenna 16. The periodic data burst from the leader aircraft 20 contains the lead aircraft position. The continuous RF signal and the periodic data burst from the leader aircraft 20 are received in the first follower aircraft 25 with the first follower aircraft receiver 12. The first follower aircraft 25 determines a bearing, distance and elevation measurement relative to the lead aircraft 20 from the continuous RF signal by using the first follower aircraft resolver 13. The first follower aircraft 25 transmits an intermittent RF signal and a periodic data burst using its transmitter 15 and antenna array 11. The periodic data burst has relative position data of the first follower aircraft 25 to the lead aircraft 20 as determined from the bearing, distance and elevation measurement. The lead aircraft 20 receives with its antenna array 11 and receiver 12 the intermittent RF signal and the periodic data burst from the first follower aircraft 25. The lead aircraft 20 performs an independent measurement of lead aircraft 20 position relative to the first follower aircraft 25 from the received intermittent RF signal using the lead aircraft resolver 13. The lead aircraft 20 correlates the independent measurement of the lead aircraft 20 position with the received periodic data burst having the relative position of the first follower aircraft 25 in the Kalman filter 14 in system 10 on board lead aircraft 20. The Kalman filter output is used for monitoring the integrity of the system 10 by comparing the known position of the lead aircraft 20 with the Kalman filter 14 processing.

When a second follower aircraft 25 is present, the intermittent RF signal and the periodic data burst from the first follower aircraft 25 are received by the second follower aircraft 26 in the second follower aircraft receiver 12. The second follower aircraft 26 performs an independent measurement of second follower aircraft 26 position relative to the first follower aircraft 25 from the received intermittent RF signal with the second follower aircraft resolver 13. The second follower aircraft 26 correlates the independent measurement of the second follower aircraft 26 position with the received periodic data burst having the relative position of the first follower aircraft 25 in the Kalman filter 14 in the system 10 on board the second follower aircraft 26.

The continuous RF signal and the periodic data burst from the lead aircraft 20 are also received in the second follower aircraft 26. The second follower aircraft 26 determines bearing, distance and elevation relative to the lead aircraft 20 from the continuous RF signal. The second follower aircraft 26 transmits an intermittent RF signal and a periodic data burst using its transmitter 15 and antenna 16. The periodic data burst contains relative position data of the second follower aircraft 26 to the lead aircraft 20. The lead aircraft 20 receives the intermittent RF signal and the periodic data burst from the second follower aircraft 26. The lead aircraft 20 performs an independent measurement of lead aircraft 20 position relative to the second follower aircraft 26 from the received intermittent RF signal from the second follower aircraft 26. The lead aircraft 20 correlates the independent measurement of the lead aircraft 20 position with the received periodic data burst having the relative position of the second follower aircraft 26 in the Kalman filter 14 in the system 10 on board the lead aircraft 20.

The intermittent RF signal and the periodic data burst from the second follower aircraft 26 are received by the first follower aircraft 25 using the first follower aircraft receiver 12 and antenna array 11. The first follower aircraft 25 performs an independent measurement of first follower aircraft 25 position relative to the second follower aircraft 26 from the received intermittent RF signal with the first follower aircraft resolver 13. The first follower aircraft 25 correlates the independent measurement of the first follower aircraft 25 position with the received periodic data burst having the relative position of the second follower aircraft 26 in the Kalman filter 14 in the system 10.

The first follower aircraft 25 receives the continuous RF signal and the periodic data burst from the lead aircraft 20 and determines bearing, distance, and elevation relative to the lead aircraft 20 from the continuous RF signal. The first follower aircraft 25 correlates the bearing, distance, and elevation measurement relative to the lead aircraft 20 with the received periodic data burst from the lead aircraft 20 in the first follower aircraft Kalman filter 14 and provides a guidance signal output from the Kalman 14 filter for guiding the first follower aircraft 25.

The second follower aircraft 26 receives the continuous RF signal and the periodic data burst from the lead aircraft 20 and determines bearing, distance, and elevation relative to the lead aircraft 20 from the continuous RF signal. The second follower aircraft 26 correlates the bearing, distance, and elevation measurement relative to the lead aircraft 20 with the received periodic data burst from the lead aircraft 20 in the second follower aircraft Kalman filter 14 and provides a guidance signal output from the Kalman 14 filter for guiding the second follower aircraft 26.

It is believed that the system and method for improving aircraft formation flying accuracy and integrity of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method for improving aircraft formation flying accuracy and integrity in aircraft having an aircraft formation positioning system therein comprising the steps of:

transmitting from a lead aircraft a continuous RF signal and a periodic data burst said periodic data burst having lead aircraft position data;

receiving in a first follower aircraft the continuous RF signal and the periodic data burst from the lead aircraft;

determining in the first follower aircraft bearing, distance and elevation relative to the lead aircraft from the continuous RF signal;

transmitting from the first follower aircraft an intermittent RF signal and a periodic data burst said periodic data burst having relative position data of the first follower aircraft determined from the continuous RF signal;

receiving in the lead aircraft the intermittent RF signal and the periodic data burst from the first follower aircraft;

performing in the lead aircraft an independent measurement of lead aircraft position relative to the first follower aircraft from the received intermittent RF signal from the first follower aircraft;

correlating in the lead aircraft the independent measurement of the lead aircraft position relative to the first follower aircraft with the received periodic data burst from the first follower aircraft in a lead aircraft Kalman filter to obtain a lead aircraft position; and comparing the lead aircraft position from the Kalman filter with a known lead aircraft position to provide an indication of the aircraft formation positioning system integrity.

2. The method for improving aircraft formation flying accuracy and integrity of claim 1 further comprising the steps of:

receiving in a second follower aircraft the intermittent RF signal and the periodic data burst from the first follower aircraft;

performing in the second follower aircraft an independent measurement of second follower aircraft position relative to the first follower aircraft from the received intermittent RF signal from the first follower aircraft;

correlating in the second follower aircraft the independent measurement of the second follower aircraft position relative to the first follower aircraft with the received periodic data burst from the first follower aircraft in a second follower aircraft Kalman filter; and providing a guidance signal output from the second follower aircraft Kalman filter for guiding the second follower aircraft.

3. The method for improving aircraft formation flying accuracy and integrity of claim 1 further comprising the steps of:

receiving in a second follower aircraft the continuous RF signal and the periodic data burst from the lead aircraft;

determining in the second follower aircraft bearing, distance and elevation relative to the lead aircraft from the continuous RF signal from the lead aircraft;

transmitting from the second follower aircraft an intermittent RF signal and a periodic data burst said periodic data burst having relative position data of the second follower aircraft determined from the continuous RF signal from the lead aircraft;

receiving in the lead aircraft the intermittent RF signal and the periodic data burst from the second follower aircraft;

performing in the lead aircraft an independent measurement of lead aircraft position relative to the second follower aircraft from the received intermittent RF signal from the second follower aircraft;

correlating in the lead aircraft the independent measurement of the lead aircraft position relative to the second follower aircraft with the received periodic data burst from the second follower aircraft in the lead aircraft Kalman filter; and providing an output from the lead aircraft Kalman filter for determining the aircraft formation positioning system integrity.

4. The method for improving aircraft formation flying accuracy and integrity of claim 3 further comprising the steps of:

receiving in the first follower aircraft the intermittent RF signal and the periodic data burst from the second follower aircraft;

performing in the first follower aircraft an independent measurement of first follower aircraft position relative to the second follower aircraft from the received intermittent RF signal from the second follower aircraft;

correlating in the first follower aircraft the independent measurement of the first follower aircraft position relative to the second follower aircraft with the received periodic data burst from the second follower aircraft in a first follower aircraft Kalman filter; and providing a guidance signal output from the first follower aircraft Kalman filter for guiding the first follower aircraft.

5. The method for improving aircraft formation flying accuracy and integrity of claim 1 further comprising the steps of:

correlating in the first follower aircraft the bearing, distance, and elevation measurement relative to the lead aircraft with the received periodic data burst from the lead aircraft in a first follower aircraft Kalman filter; and providing a guidance signal output from the first follower aircraft Kalman filter for guiding the first follower aircraft.

6. The method for improving aircraft formation flying accuracy and integrity of claim 3 further comprising the steps of:

correlating in the second follower aircraft the bearing, distance, and elevation measurement relative to the lead aircraft with the received periodic data burst from the lead aircraft in a second follower aircraft Kalman filter; and providing a guidance signal output from the second follower aircraft Kalman filter for guiding the second follower aircraft.

7. The method for improving aircraft formation flying accuracy and integrity of claim 1 further comprising the steps of:

receiving the continuous RF signal and the periodic data burst from the lead aircraft in each aircraft in a formation of two or more follower aircraft;

performing independent measurements in each follower aircraft of its own bearing, distance, and elevation relative to each of the other follower aircraft using intermittent RF signals from each of the other follower aircraft;

determining bearing, distance and elevation relative to the lead aircraft from the continuous RF signal from the lead aircraft in each follower aircraft;

correlating the bearing, distance and elevation relative to the lead aircraft with each follower aircraft relative position received in a periodic data burst in a Kalman filter in each follower aircraft thereby enabling all follower aircraft in the formation to improve accuracy of its own relative position estimate.

8. The method for improving aircraft formation flying accuracy and integrity of claim 7 further comprising the step of providing a guidance signal output from the Kalman filter in each follower aircraft for guiding each of the follower aircraft.

9. The method for improving aircraft formation flying accuracy and integrity of claim 7 further comprising the steps of:
   detecting an error in the aircraft formation positioning system in a follower aircraft; and
   continuing flying for a period of time after losing the continuous RF signal from the lead aircraft.

10. The method for improving aircraft formation flying accuracy and integrity of claim 9 further comprising the step of taking over the formation as acting lead aircraft with a follower aircraft when the lead aircraft continuous RF signal fails.

11. An aircraft formation positioning system for improving aircraft formation flying accuracy and integrity comprising:
   a transmitter in a lead aircraft for transmitting a continuous RF signal and a periodic data burst said periodic data burst having lead aircraft position data;
   a receiver in a first follower aircraft for receiving the continuous RF signal and the periodic data burst from the lead aircraft;
   a resolver in the first follower aircraft connected to the first follower aircraft receiver and for determining bearing, distance and elevation relative to the lead aircraft from the continuous RF signal from the lead aircraft;
   a transmitter in the first follower aircraft connected to the first follower aircraft resolver and for transmitting an intermittent RF signal and a periodic data burst said periodic data burst having relative position data of the first follower aircraft determined from the continuous RF signal;
   a receiver in the lead aircraft for receiving the intermittent RF signal and the periodic data burst from the first follower aircraft;
   a resolver in the lead aircraft connected to the lead aircraft receiver and for performing an independent measurement of lead aircraft position relative to the first follower aircraft from the received intermittent RF signal from the first follower aircraft; and
   a Kalman filter in the lead aircraft connected to the lead aircraft resolver and the lead aircraft receiver and for correlating the independent measurement of the lead aircraft position relative to the first follower aircraft with the received periodic data burst from the first follower aircraft, said Kalman filter in the lead aircraft providing an output signal for obtaining an indication of aircraft formation positioning system integrity.

12. The aircraft formation positioning system for improving aircraft formation flying accuracy and integrity of claim 11 further comprising:
   a receiver in a second follower aircraft for receiving the intermittent RF signal and the periodic data burst from the first follower aircraft;
   a resolver in the second follower aircraft connected to the second follower aircraft receiver and for performing an independent measurement of second follower aircraft position relative to the first follower aircraft from the received intermittent RF signal from the first follower aircraft; and
   a Kalman filter in the second follower aircraft connected to the second follower aircraft receiver and the second follower aircraft resolver and for correlating the independent measurement of the second follower aircraft position relative to the first follower aircraft with the received periodic data burst from the first follower aircraft, said Kalman filter in the second follower aircraft providing a guidance signal output for guiding the second follower aircraft.

13. The aircraft formation positioning system for improving aircraft formation flying accuracy and integrity of claim 11 further comprising:
   a receiver in the second follower aircraft for receiving the continuous RF signal and the periodic data burst from the lead aircraft;
   a resolver in the second follower aircraft connected to the second follower aircraft receiver and for determining bearing, distance and elevation relative to the lead aircraft from the continuous RF signal;
   a transmitter in the second follower aircraft for transmitting an intermittent RF signal and a periodic data burst said periodic data burst having relative position data of the second follower aircraft;
   the receiver in the lead aircraft for receiving the intermittent RF signal and the periodic data burst from the second follower aircraft;
   the resolver in the lead aircraft connected to the lead aircraft receiver and for performing an independent measurement of lead aircraft position relative to the second follower aircraft from the received intermittent RF signal from the second follower aircraft; and
   the Kalman filter in the lead aircraft connected to the lead aircraft resolver and the lead aircraft receiver and for correlating the independent measurement of the lead aircraft position relative to the second follower aircraft with the received periodic data burst from the second follower aircraft.

14. The aircraft formation positioning system for improving aircraft formation flying accuracy and integrity of claim 13 further comprising:
   the receiver in the first follower aircraft for receiving the intermittent RF signal and the periodic data burst from the second follower aircraft;
   the resolver in the first follower aircraft connected to the first follower aircraft receiver and for performing an independent measurement of first follower aircraft position relative to the second follower aircraft from the received intermittent RF signal from the second follower aircraft;
   a Kalman filter in the first follower aircraft connected to the first follower aircraft receiver and the first follower aircraft resolver and for correlating the independent measurement of the first follower aircraft position relative to the second follower aircraft with the received periodic data burst from the second follower aircraft, said Kalman filter in the first follower aircraft providing a guidance signal output for guiding the first follower aircraft.

15. An aircraft formation positioning system for improving aircraft formation flying accuracy and integrity said system disposed on a first aircraft in a formation and comprising:

an antenna array on the first aircraft for receiving an RF signal and a periodic data burst from a second aircraft in the formation;

a receiver on the first aircraft connected to the antenna array for processing the RF signal and the periodic data burst received from the second aircraft;

a resolver on the first aircraft connected to the receiver and for determining bearing, distance and elevation relative to the second aircraft using the RF signal from the second aircraft;

a transmitter on the first aircraft connected to the resolver and for transmitting an RF signal and a periodic data burst said periodic data burst having relative position data of the first aircraft determined from the RF signal from the second aircraft; and a Kalman filter on the first aircraft connected to the resolver and the receiver and for correlating the independent measurement of the first aircraft position relative to the second aircraft with the received periodic data burst from the second aircraft, said Kalman filter providing an output signal for guiding the first aircraft.

16. The aircraft formation positioning system for improving aircraft formation flying accuracy and integrity of claim 15 wherein said first aircraft is a lead aircraft having said system and wherein said transmitter transmits a continuous RF signal and the periodic data burst and said Kalman filter output signal provides an indication of aircraft formation positioning system integrity.

17. The aircraft formation positioning system for improving aircraft formation flying accuracy and integrity of claim 15 wherein said first aircraft is a follower aircraft having said system and wherein said transmitter transmits a intermittent RF signal and the periodic data burst and said Kalman filter output signal provides a guidance signal output for guiding the first aircraft.

* * * * *